Oct. 21, 1924.
A. G. FRANSEN
1,512,530
CHICKEN DELOUSING APPARATUS
Filed May 18, 1922
2 Sheets-Sheet 1
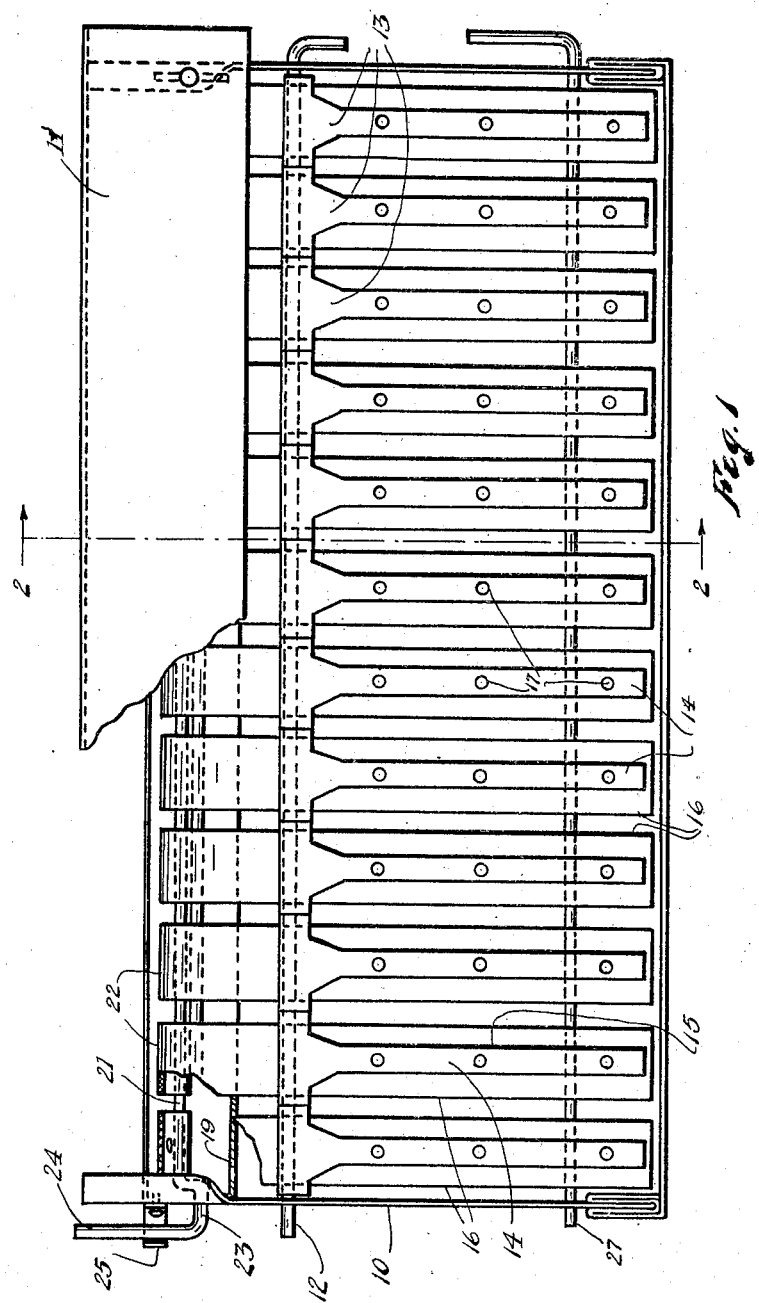
Witnesses:
Inventor
Albert G. Fransen
By Joslun R H Potts
His Attorney Oct. 21, 1924.
A. G. FRANSEN
1,512,530
CHICKEN DELOUSING APPARATUS
Filed May 18, 1922    2 Sheets-Sheet 2
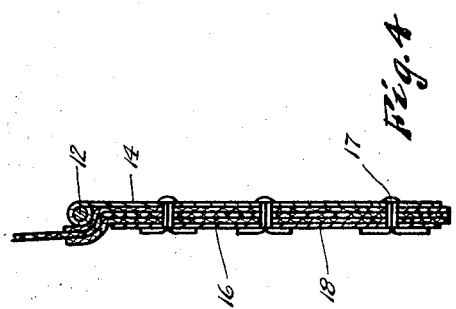
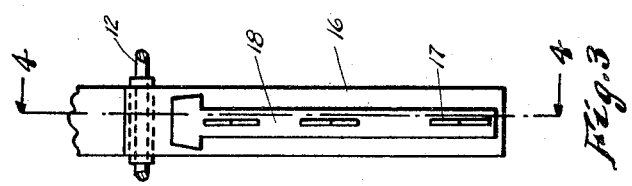
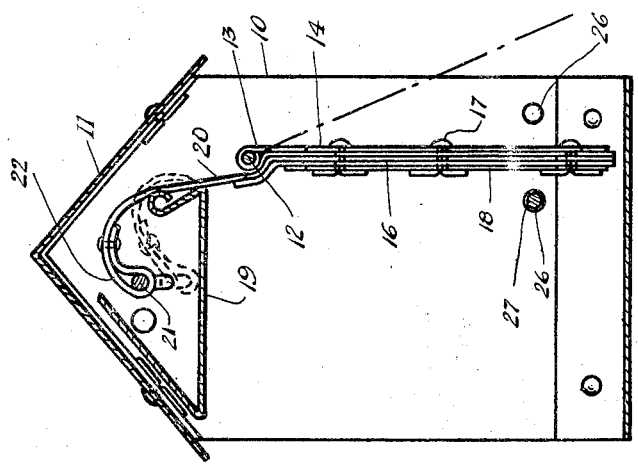
Witnesses
Inventor
Albert G. Fransen Patented Oct. 21, 1924.

1,512,530

UNITED STATES PATENT OFFICE.

ALBERT G. FRANSEN, OF CHICAGO, ILLINOIS.

CHICKEN-DELOUSING APPARATUS.

Application filed May 18, 1922. Serial No. 561,897.

*To all whom it may concern:*

Be it known that I, ALBERT G. FRANSEN, a citizen of the United States, and a resident of the city of Chicago, county of Cook, and State of Illinois, have invented certain new and useful Improvements in Chicken-Delousing Apparatus, of which the following is a specification.

My invention relates to chicken delousing apparatus, and has for its object the provision of means for effectively distributing insecticide to chickens as they pass through the apparatus in moving from one point to another.

Another object of the invention is to provide such apparatus with means to maintain the insecticide distributing means operative without constant attention.

Still another object of the invention is to provide means operative by capillary attraction for supplying said distributing means with insecticide.

Still another object of the invention is to provide means whereby the apparatus can be adjusted so that chickens can pass therethrough only in one direction, or whereby said apparatus can be completely locked against the passage of chickens therethrough.

Other objects will appear hereinafter.

The invention consists in the combinations and arrangements of parts hereinafter described and claimed.

The invention will be best understood by reference to the accompanying drawings forming a part of this specification, and in which, Fig. 1, is a front elevation of the invention, showing a portion of the housing broken away to expose operative parts of the apparatus, Fig. 2, is a section on line 2—2, Fig. 1, Fig. 3, is a detail view of one of the distributing members used in connection with the invention, and Fig. 4, is a section on line 4—4, Fig. 3.

It is well known that the death of young chickens is caused in a large majority of cases by diarrhea superinduced or aggravated by lowered vitality and loss of blood due to the pernicious activities of chicken lice and other parasites. The difficulty of keeping chickens, and especially very young chickens, free of parasites, is a constant source of annoyance and irritation to chicken breeders, and in order to minimize or eliminate the labor incidental to applying various insecticides to the chickens, I have provided means for thoroughly distributing insecticide to the chickens, which means are operable by the movements of the chickens in passing from one place to another.

The preferred form of construction comprises a housing 10 of any suitable material, preferably of galvanized sheet metal, such housing preferably being of a width to snugly fill a doorway through which the chickens customarily pass, and of a sufficient height to prevent the chickens passing thereover. Although the apparatus is particularly designed to be interposed in a doorway, it is obvious that it may be placed in runways or in any other situations. In order to exclude rain, snow or dust from the housing, such housing is preferably provided with a sloping roof 11, as shown.

Preferably extending longitudinally through the housing 10 is a support 12 upon which is mounted a plurality of pendulous distributing members 13 adapted to contain a quantity of insecticide, such members having their lower portions so spaced from each other that chickens cannot pass therebetween without scraping or brushing against the members as they yield to permit its passage, the action being such that a large amount of the insecticide is rubbed onto all sides of the chickens. The distributing members 13 each preferably consists of a metallic blade 14, having its lower end reduced, as shown at 15. Secured to the reduced portion 15 is a plurality of wicks 16, preferably disposed one on top of the other, and projecting a suitable distance at either side of the reduced portion 15, as shown. The wicks 16 are preferably detachably fastened to the reduced portion 15, by means of suitable fastening pins 17, such wicks being stiffened and reinforced by a back plate 18 held in position thereon by means of the pins 17.

Disposed adjacent the rod 12 preferably at one side of and above said rod, and extending substantially parallel therewith is a reservoir 19 which is adapted to contain a quantity of any suitable insecticide. Suitable means may be provided for furnishing a quantity of insecticide to the distributing members 13 and such means preferably consists in enlongating one of the wicks 16 of each distributor preferably one situated between the other wicks 16, as shown at 20, so that same extends over the edge of the reservoir 19, such extension being adapted to communicate with the insecticide in such reservoir, and thereby supply the wicks 16 through the agency of capillary attraction, as will be readily understood.

The construction described is such that the extension 20 on each of the distributing members 13 may be placed in communication with the reservoir only a comparatively short time, and at infrequent intervals, immersion of the extensions 20 in the insecticide for a period of one hour, serving to deliver a sufficient quantity of the insecticide to the distributors 13 to render same effective for approximately two or three weeks. In order to provide for simultaneously immersing elongations 20 for the comparatively short period necessary to supply the distributors, I provide a crank shaft 21 which extends through the housing preferably above the reservoir 19, and the elongations 20 are secured to said shaft by means of looping the ends of same over the shaft, as shown at 22. The crank shaft 21 is journaled in the housing, as shown at 23, and provided with a handle 24, such handle in inoperative position of the shaft 21 and the elongations 20 being adapted to rest against a stop 25.

It is thus evident that in order to keep the distributors 13 supplied with insecticide it is only necessary to turn the handle 24 away from the stop 25 to dip the elongations 20 into the reservoir 19, allowing such elongations to remain therein for a period of time necessary to replenish the supply of insecticide to the distributors, approximately one hour being required to saturate the wicks 16, at which time the shaft 21 is again turned to inoperative position. Sometimes it becomes desirable to permit the passage of the chickens through the apparatus in ony one direction and to accomplish this purpose I preferably provide each end of the housing 10 with apertures 26, such apertures being disposed one on each side of the distributors 13, adjacent the lower ends thereof, and a suitable distance from the bottom of the apparatus to permit the passage of a chicken thereunder. When it is desired to permit egress of the chickens from the apparatus, a rod 27 is projected through the apertures 26 behind the distributors 13, so that as the chickens pass through the distributors, such distributors swing outwardly, but when the chicken attempts to re-enter the apparatus the distributors swing against the rod 27 and bar its passage. The direction of movement of the chickens may be reversed by placing the rod 27 in the apertures on the opposite side of the distributors, as will be evident, and in order to bar movement of chickens through the apparatus in either direction, another rod (not shown) may be inserted in the unoccupied apertures 26 to prevent swinging of the distributors in either direction to prevent the passage of a chicken therethrough.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A fowl delousing apparatus, comprising a plurality of inflexible movable members; flexible absorbent means mounted on said members, adapted to contain insecticide, said members being spaced for fowls to pass between and brush against said means during passage therepast; and absorbent elongations on said absorbent means in communication with a supply of insecticide.

2. A fowl delousing apparatus, comprising a plurality of inflexible movable members; flexible absorbent means mounted on said members, adapted to contain insecticide, and being so arranged that fowls must brush against the same during passage therepast; elongations on said absorbent means in communication with a supply of insecticide; and means for placing said elongations into and out of communication with said supply.

3. A fowl delousing apparatus, comprising a plurality of inflexible movable members, flexible absorbent means mounted on said members adapted to contain insecticide, and being so arranged that fowls must brush against the same during passage therepast; absorbent elongations upon said absorbent means; a reservoir disposed at a distance from said members; and a crank shaft having said elongations connected thereto and adapted to place the same into and out of communication with said reservoir.

4. A fowl delousing apparatus, comprising a plurality of movable distributing members containing insecticide, so arranged that fowls must brush against same during passage therepast; and means for locking said distributing members against movement in one direction or the other.

5. A fowl delousing apparatus, comprising a plurality of movable distributing members containing insecticide, and arranged to swing forwardly with fowls which brush against same during passage therepast; and means for locking said members against swinging movement.

6. A fowl delousing apparatus, comprising a plurality of movable absorbent distributing members; a reservoir situated at a distance from said distributing members; an absorbent elongation on each of said distribution members, extending into communication with said reservoir; and a crank shaft for simultaneously placing said elongations into and out of communication with said reservoir.

7. A fowl delousing apparatus, comprising a plurality of movable forwardly swinging supporting members, said members having reduced portions thereon; and absorbent distributing means containing insecticide mounted on and projecting from the sides of said reduced portions, such projecting portions being slightly spaced and arranged that fowls must brush there against during passage therebetween.

8. A fowl delousing apparatus, comprising a housing having a passage therethrough; a plurality of movable distributing members containing insecticide so arranged that the fowls must brush against same during passage therepast; a reservoir mounted in said housing; absorbent means extending from said distributing members and adapted to be placed in communication with said reservoir; and means adapted to project through said housing alongside of said distributing members to prevent swinging thereof, except in one direction.

9. A fowl delousing apparatus comprising a housing having a passage therethrough; a support mounted in said passage; a plurality of pendulous distributing members mounted on said support; a reservoir mounted in said housing and extending substantially parallel with said support; a crank shaft disposed above said reservoir; and absorbent means connected to said pendulous members and extending to and being connected to said crank shaft, said crank shaft being adapted to move said absorbent means into and out of communication with said reservoir.

In testimony whereof I have signed my name to this specification in the presence of two subscribing witnesses.

ALBERT G. FRANSEN.

Witnesses:
FREDA C. APPLETON,
MARGARET AUER.